US012143002B2

(12) United States Patent
Lin et al.

(10) Patent No.: US 12,143,002 B2
(45) Date of Patent: Nov. 12, 2024

(54) HYBRID SWITCHING POWER CONVERTER

(71) Applicant: Richtek Technology Corporation, Zhubei (TW)

(72) Inventors: Jiun-Jang Lin, Taichung (TW); Jhen-Yu Li, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 252 days.

(21) Appl. No.: 18/056,274

(22) Filed: Nov. 17, 2022

(65) Prior Publication Data

US 2023/0170785 A1 Jun. 1, 2023

Related U.S. Application Data

(60) Provisional application No. 63/283,404, filed on Nov. 26, 2021.

(30) Foreign Application Priority Data

Aug. 31, 2022 (TW) .................................. 111132885

(51) Int. Cl.
 *H02M 1/00* (2007.01)
(52) U.S. Cl.
 CPC ......... *H02M 1/0095* (2021.05); *H02M 1/009* (2021.05)

(58) Field of Classification Search
 CPC .......................... H02M 1/009; H02M 1/0095
 USPC .......................................................... 363/13
 See application file for complete search history.

(56) References Cited

U.S. PATENT DOCUMENTS

| 10,547,241 | B1* | 1/2020 | Li | H02M 3/1588 |
| 2019/0348913 | A1* | 11/2019 | Zhang | H02M 3/07 |
| 2020/0244155 | A1* | 7/2020 | Zambetti | H02M 3/158 |
| 2022/0181973 | A1* | 6/2022 | Huang | H02M 3/07 |

* cited by examiner

*Primary Examiner* — Yemane Mehari
(74) *Attorney, Agent, or Firm* — Tung & Associates

(57) ABSTRACT

A hybrid switching power converter is configured to perform power conversion between a first power, a second power, and a third power. The hybrid switching power converter includes a switched inductor conversion circuit and a switched capacitor conversion circuit, wherein the switched inductor conversion circuit is configured to perform the power conversion between the first power and the second power, and the switched capacitor conversion circuit is configured to perform the power conversion between the second power and the third power. The switched inductor conversion circuit includes a plurality of inductor switches, wherein the plural inductor switches include a first switch and a second switch. The switched capacitor conversion circuit includes a plurality of capacitor switches, wherein the plural capacitor switches include the first switch and the second switch.

11 Claims, 15 Drawing Sheets

HYBRID SWITCHING POWER CONVERTER

CROSS REFERENCE

The present invention claims priority to U.S. 63/283,404 filed on Nov. 26, 2021, and TW 111132885, filed on Aug. 31, 2022.

BACKGROUND OF THE INVENTION

Field of Invention

The present invention relates to a converter, in particular to a hybrid switching power converter.

Description of Related Art

Different from the maximum output voltage defined by the universal serial bus power delivery (USB PD) specification in the past, the latest USB PD 3.1 specification defines a maximum output voltage of 48 volts (V), which has a broader range of output voltage to charge various types of portable electronic products (such as mobile phones, tablets, notebook computers, etc.). The various types of portable electronic products typically include a battery pack which is formed by one or more batteries (e.g., 1 to 4 batteries) connected in series, so that the battery pack can provide a voltage in a range (e.g., 0 volts to 18 volts). However, most of the conventional power converters are designed based on the past USB PD specifications, so the past power converters cannot convert to generate a power with a larger voltage value (e.g., 48 volts). Therefore, if the USB PD 3.1 specification is directly applied to the conventional power converters, the advantages of the USB PD 3.1 specification cannot be realized, and there is a high risk of damaging the devices in the power converter due to insufficient voltage withstanding capability.

In view of the above, the present invention proposes a hybrid switching power converter suitable for the USB PD 3.1 specification, which can realize high efficiency and broad voltage range power conversion, and further has the advantages of lower cost, smaller size, and lower overall power loss.

SUMMARY OF THE INVENTION

From one perspective, the present invention provides a hybrid switching power converter configured to perform power conversion among a first power, a second power, and a third power, the hybrid switching power converter comprising: a switched inductor conversion circuit, comprising a plurality of inductive switches and an inductor, wherein the inductive switches comprise a first switch and a second switch, and the switched inductor conversion circuit is configured to switch coupling relationships between the inductor and the first power and between the inductor and the first power the second power to perform the power conversion between the first power and the second power; and a switched capacitor conversion circuit, comprising a plurality of capacitive switches and a conversion capacitor, wherein the capacitive switches comprise the first switch and the second switch, and the switched capacitor conversion circuit is configured to switch coupling relationships between the conversion capacitor and the second power and between the conversion capacitor and the third power to perform the power conversion between the second power and the third power; wherein when a voltage of the third power is greater than a product of a voltage of the first power multiplied by a predetermined factor, the switched inductor conversion circuit operates in a first inductive conversion mode according to a first duty ratio to perform the power conversion between the first power and the second power, and the switched capacitor conversion circuit operates in a capacitive conversion mode according to the first duty ratio to perform the power conversion between the second power and the third power, wherein a voltage of the second power is greater than the voltage of the first power, the voltage of the third power is a product of the voltage of the second power multiplied by the predetermined factor, and the predetermined factor is greater than one; wherein when the switched inductor conversion circuit operates in the first inductive conversion mode, the switched inductor conversion circuit controls a first end of the inductor to periodically switch between the second power a ground potential according to the first duty ratio and controls a second end of the inductor and the first power to be always conducted to each other; and wherein when the switched capacitor conversion circuit operates in the capacitive conversion mode, the switched capacitor conversion circuit controls a third end of the conversion capacitor to periodically switch between the third power and the second power according to the first duty ratio and controls a fourth end of the conversion capacitor to periodically switch between the second power and the ground potential.

In one embodiment, the preset magnification is two.

In one embodiment, when the voltage of the third power is less than the voltage of the first power, the switched inductor conversion circuit operates in a second inductive conversion mode according to a second duty ratio to perform the power conversion between the first power and the second power, and the switched capacitor conversion circuit operates in a bypass mode, wherein the voltage of the second power is less than the voltage of the first power; when the voltage of the third power is greater than the voltage of the first power and less than the product of the voltage of the first power multiplied by the predetermined factor, the switched inductor conversion circuit operates in the first inductive conversion mode according to a third duty ratio to perform the power conversion between the first power and the second power, and the switched capacitor conversion circuit operates in an adaptive mode according to the third duty ratio; when the switched inductor conversion circuit operates in the second inductive conversion mode, the switched inductor conversion circuit controls the first end of the inductor and the second power to be always conducted to each other and controls the second end of the inductor to periodically switch between the first power and the ground potential according to the second duty ratio; when the switched capacitor conversion circuit operates in the bypass mode, the switched capacitor conversion circuit controls the second power and the third power to be always conducted to each other; and wherein when the switched capacitor conversion circuit operates in the adaptive mode, the switched capacitor conversion circuit controls the fourth end of the conversion capacitor to periodically switch between the second power and the ground potential according to the third duty ratio, so that a voltage across the conversion capacitor is maintained at a fixed value, wherein when the fourth end of the conversion capacitor is conducted on the second power, the switched capacitor conversion circuit controls the second power and the third power to be conducted to each other, and when the fourth end of the conversion capacitor is conducted on the ground potential, the switched capacitor conversion circuit controls the second power and the third power to be open circuit in between.

In one embodiment, the fixed value is zero volt.

In one embodiment, the inductive switches further comprise a third switch and a fourth switch, wherein the first switch and the second switch are coupled in series between the second power and the ground potential and are commonly coupled to the first end of the inductor and the fourth end of the conversion capacitor, the third switch and the fourth switch are coupled in series between the ground potential and the first power and are commonly coupled to the second end of the inductor; the capacitive switches further comprise a fifth switch and a sixth switch, wherein the fifth switch and the sixth switch are coupled in series between the second power and the third power and are commonly coupled to the third end of the conversion capacitor, the fifth switch and the first switch are coupled in series between the third end and the fourth end of the conversion capacitor and are commonly coupled to the second power; wherein the first power is coupled to the fourth switch, the second power is coupled between the first switch and the fifth switch, and the third power is coupled to the sixth switch.

In one embodiment, when the switched capacitor conversion circuit operates in the first inductive conversion mode, the first switch and the second switch are periodically turned ON in turn according to the first duty ratio, the third switch is always OFF, and the fourth switch is always ON.

In one embodiment, when the switched capacitor conversion circuit operates in the second inductive conversion mode, the first switch is always ON, the second switch is always OFF, and the third switch and the fourth switch are periodically turned ON in turn according to the second duty ratio.

In one embodiment, when the switched capacitor conversion circuit operates in the capacitive conversion mode, the first switch, the second switch, the fifth switch, and the sixth switch are periodically turned ON in turn according to the first duty ratio in a manner that the first switch and the sixth switch are switched in phase, and the second switch and the fifth switch are switched in phase.

In one embodiment, when the switched capacitor conversion circuit operates in the bypass mode, the first switch, the fifth switch, and the sixth switch are always ON, and the second switch is always OFF.

In one embodiment, when the switched capacitor conversion circuit operates in the adaptive mode, the first switch and the second switch are periodically turned ON in turn according to the second duty ratio, and the fifth switch and the sixth switch are switched in phase with the first switch.

In one embodiment, when an absolute value of a difference between the voltage of the third power and the voltage of the first power is less than a predetermined voltage difference, the switched inductor conversion circuit operates in a third inductive conversion mode according to a fourth duty ratio to perform the power conversion between the first power and the second power, and the switched capacitor conversion circuit operates in the adaptive mode, wherein the voltage of the second power is equal to the voltage of the third power; wherein when the switched inductor conversion circuit operates in the third inductive conversion mode, the switched inductor conversion circuit controls coupling relationships of the first end and the second end of the inductor according to the fourth duty ratio, so that the inductor is periodically switched between two states: conducted between the second power and the ground potential or conducted between the first power and the ground potential; and wherein when the switched capacitor conversion circuit operates in the adaptive mode, the switched capacitor conversion circuit controls the fourth end of the conversion capacitor to periodically switch between the second power and the ground potential according to the fourth duty ratio, so that a voltage across the conversion capacitor is maintained at a fixed value, wherein when the fourth end of the conversion capacitor is conducted to the second power, the switched capacitor conversion circuit controls the second power and the third power to be conducted to each other, and when the fourth end of the conversion capacitor is conducted to the ground potential, the switched capacitor conversion circuit controls the second power and the third power to be open circuit in between.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
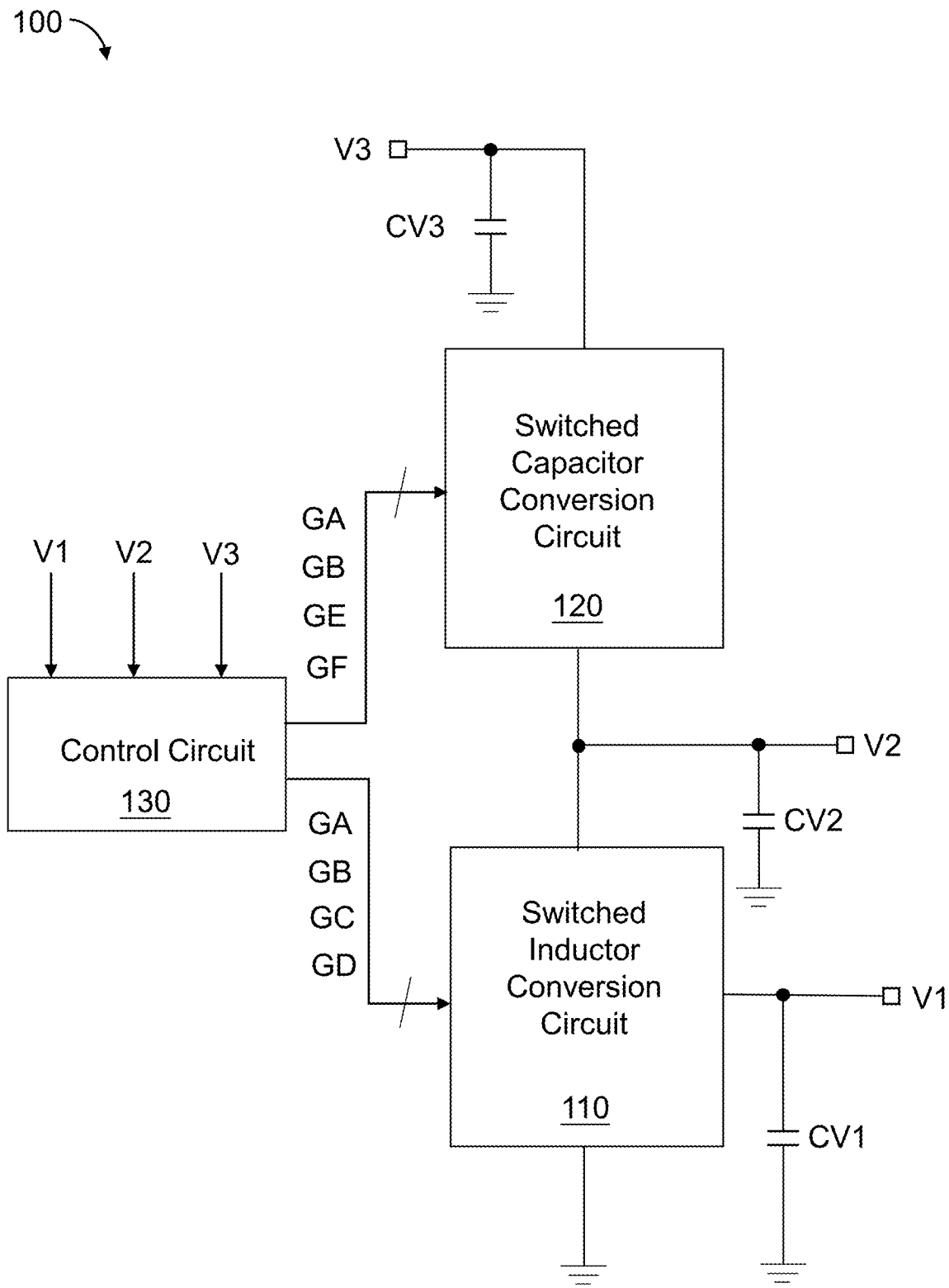
FIG. 1 is a block diagram of a hybrid switching power converter according to an embodiment of the present invention.

Please refer to FIG. 1. FIG. 1 is a schematic block diagram of a hybrid switching power converter 100 according to an embodiment of the present invention. As shown in FIG. 1, the hybrid switching power converter 100 includes a switched inductor conversion circuit 110, a switched capacitor conversion circuit 120, and a control circuit 130. The control circuit 130 is configured to generate the first control signal GA, the second control signal GB, the third control signal GC, the fourth control signal GD, the fifth control signal GE, and the sixth control signal GF according to the first power V1, the second power V2, and the third power V3, and configured to determine the duty ratio of each control signal, so as to control plural inductor switches in the switched inductor conversion circuit 110 and plural capacitor switches in the switched capacitor conversion circuit 120 to perform power conversions among the first power V1, the second power V2, and the third power V3. Please refer to the following embodiments for the details of the operation of the hybrid switching power converter 100 in various operation modes; in the following description, in order to simplify the drawings so that the details of the operation modes can be better understood, the control circuit 130 is omitted in the drawings.

Figure 2:
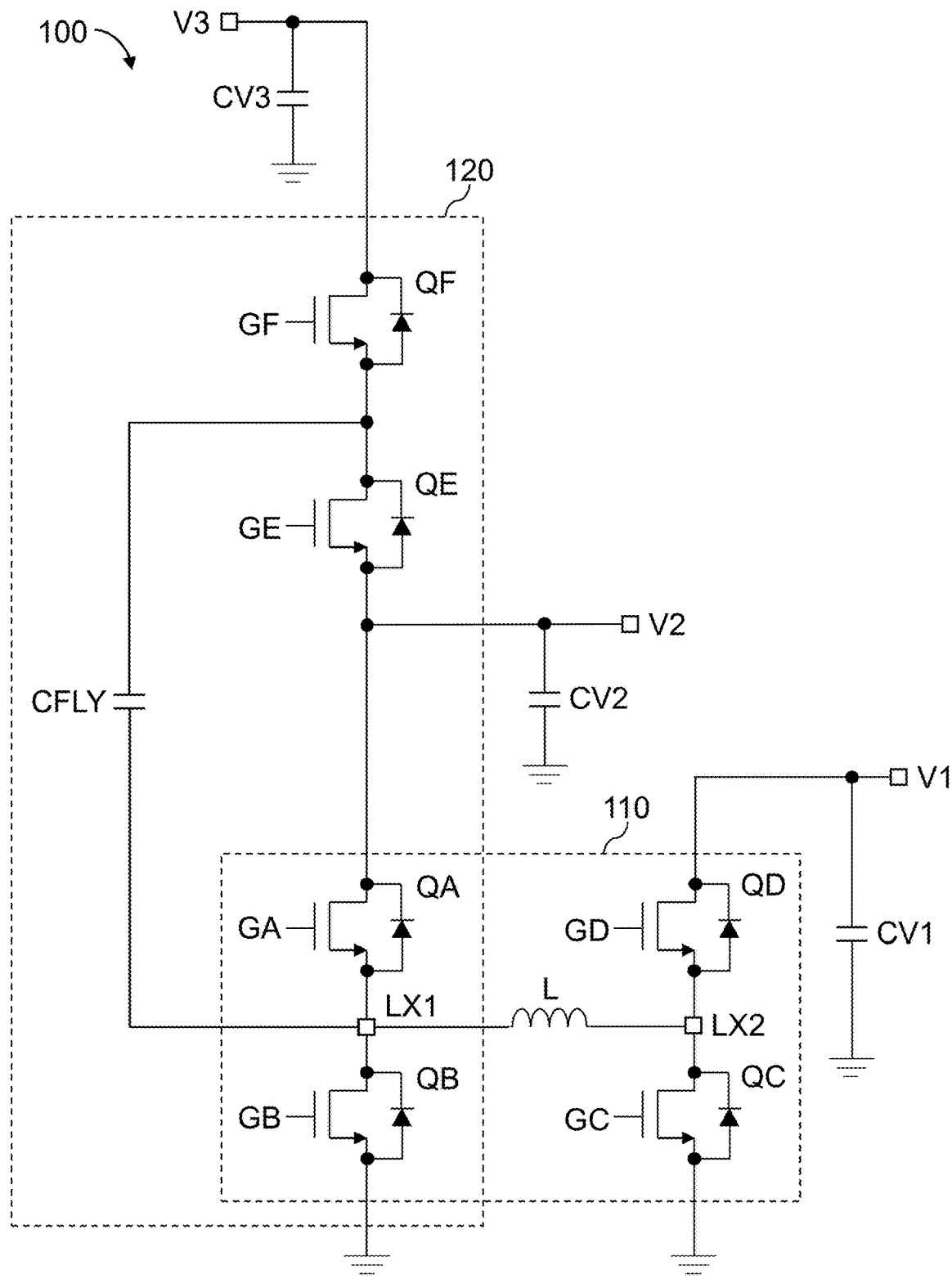
FIG. 2 is a schematic circuit diagram of a hybrid switching power converter according to an embodiment of the present invention.

Please refer to FIG. 2. FIG. 2 is a schematic circuit diagram of the hybrid switching power converter 100 according to an embodiment of the present invention, wherein the hybrid switching power converter 100 is configured to perform power conversions among the first power V1, the second power V2, and the third power V3. As shown in FIG. 2, the hybrid switching power converter 100 includes the switched inductor conversion circuit 110 and the switched capacitor conversion circuit 120, wherein the switched inductor conversion circuit 110 is configured to switch coupling relationships between the inductor L and the first power V1 and between the inductor L and the second power V2 to perform the power conversion between the first power V1 and the second power V2. The switched capacitor conversion circuit 120 is configured to switch coupling relationships between the conversion capacitors CFLY and the second power V2 and between the conversion capacitors CFLY and the third power V3 to perform the power conversion between the second power V2 and the third power V3. The details of the structures and functions of the switched inductor conversion circuit 110 and the switched capacitor conversion circuit 120, and how they are configured to operate and cooperate, are described below.

As shown in FIG. 2, the switched inductor conversion circuit 110 includes plural inductive switches and an inductor L, and the switched capacitor conversion circuit 120 includes plural capacitive switches and a conversion capacitor CFLY. In some embodiments, the inductive switches include a first switch QA (controlled by a first control signal GA), a second switch QB (controlled by a second control signal GB), and a third switch QC (controlled by a third control signal GC), and a fourth switch QD (controlled by a fourth control signal GD). The capacitive switches include the first switch QA (controlled by the first control signal GA), the second switch QB (controlled by the second control signal GB), a fifth switch QE (controlled by a fifth control signal GE), and a sixth switch QF (controlled by a sixth control signal GF). The inductor L has a first end corresponding to a first switching node LX1, and the inductor L has a second end corresponding to a second switching node LX2. The conversion capacitor CFLY has a third end coupled between the fifth switch QE and the sixth switch QF, and the conversion capacitor CFLY has a fourth end corresponding to the first switching node LX1.

In some embodiments, the first switch QA and the second switch QB are connected in series between the second power V2 and the ground potential, and are commonly coupled to the first end of the inductor L (corresponding to first switching node LX1) and the fourth end of the conversion capacitor CFLY (corresponding to first switching node LX1). The third switch QC and the fourth switch QD are coupled in series between the ground potential and the first power V1, and are commonly coupled to the second end of the inductor L (corresponding to second switching node LX2). In some embodiments, the fifth switch QE and the sixth switch QF are coupled in series between the second power V2 and the third power V3, and are commonly coupled to the third end of the conversion capacitor CFLY. The fifth switch QE and the first switch QA are coupled in series between the third end and the fourth end (corresponding to first switching node LX1) of the conversion capacitor CFLY, and are commonly coupled to the second power V2. In some embodiments, the first power V1 and the first capacitor CV1 are coupled to the fourth switch QD; the second power V2 and the second capacitor CV2 are coupled between the first switch QA and the fifth switch QE; and the third power V3 and the third capacitor CV3 are coupled to the sixth switch QF, wherein the first capacitor CV1, the second capacitor CV2, and the third capacitor CV3 provide energy storage functions.

Please refer to table 1. Table 1 is a table of different combinations of operation modes of the switched inductor conversion circuit 110 and the switched capacitor conversion circuit 120 under different power conversion conditions according to an embodiment of the present invention. As shown in table 1, in some embodiments, the hybrid switching power converter 100 has four power conversion conditions: when the voltage of the third power V3 is greater than the product of the voltage of the first power V1 multiplied by a predetermined factor (as indicated by the factor c in table 1), the switched inductor conversion circuit 110 operates in the first inductive conversion mode and the switched capacitor conversion circuit 120 operates in the capacitive conversion mode. When the voltage of the third power V3 is less than the voltage of the first power V1, the switched inductor conversion circuit 110 operates in the second inductive conversion mode and the switched capacitor conversion circuit 120 operates in the bypass mode. When the voltage of the third power V3 is greater than the voltage of the first power V1 and less than the product of the voltage of the first power V1 and the predetermined factor c, the switched inductor conversion circuit 110 operates in the first inductive conversion mode and the switched capacitor conversion circuit 120 operates in the adaptive mode. When the absolute value of the difference between the voltage of the third power V3 and the voltage of the first power V1 is less than a predetermined voltage difference (as indicated by Vth in table 1), the switched inductor conversion circuit 110 operates in the third inductive conversion mode. The predetermined voltage difference Vth can be set by the user. In a preferred embodiment, the predetermined voltage difference Vth is less than one-fifth, one-tenth, or one-twentieth of the voltage of the third power V3. The operation modes and operation methods of each of the switched inductor conversion circuit 110 and the switched capacitor conversion circuit 120 will be explained in detail below.

TABLE 1

| operation mode | switched inductor conversion circuit | switched capacitor conversion circuit |
|---|---|---|
| V3 > cV1 | first inductive conversion mode | capacitive conversion mode |
| V3 < V1 | second inductive conversion mode | bypass mode |
| V1 < V3 < cV1 | first inductive conversion mode | adaptive mode |
| |V3 − V1| < Vth | third inductive conversion mode | adaptive mode |

In some embodiments, when the voltage of the third power V3 is greater than the product of the voltage of the first power V1 multiplied by the predetermined factor c, the switched inductor conversion circuit 110 operates in the first inductive conversion mode according to a first duty ratio to perform the power conversion between the first power V1 and the second power V2, and the switched capacitor conversion circuit 120 operates in the capacitive conversion mode according to the first duty ratio to perform the power conversion between the second power V2 and the third power V3, wherein the voltage of the second power V2 is greater than the voltage of the first power V1, and the voltage of the third power V3 is the product of the voltage of the second power V2 multiplied by the predetermined factor c, wherein the predetermined factor c is greater than 1. In one embodiment, the predetermined factor c is, for example, 2.

In some embodiments, when the voltage of the third power V3 is less than the voltage of the first power V1, the switched inductor conversion circuit 110 operates in the second inductive conversion mode according to a second duty ratio to perform the power conversion between the first power V1 and the second power V2, and the switched capacitor conversion circuit 120 operates in the bypass mode, wherein the voltage of the second power V2 is less than the voltage of the first power V1.

When the voltage of the third power V3 is greater than the voltage of the first power V1 and less than the product of the voltage of the first power V1 and the predetermined factor c, the switched inductor conversion circuit 110 operates in the first inductive conversion mode according to a third duty ratio to perform the power conversion between the first power V1 and the second power V2, and the switched capacitor conversion circuit 120 operates in the adaptive mode according to the third duty ratio.

When the switched inductor conversion circuit 110 operates in the second inductive conversion mode, the switched inductor conversion circuit 110 controls the inductor L so that the first end of the inductor L and the second power are always conducted to each other, and the second end of the inductor L periodically switches between the first power V1 and the ground potential according to the second duty ratio.

When the switched capacitor conversion circuit 120 operates in the bypass mode, the switched capacitor conversion circuit 120 controls the second power V2 and the third power V3 to be always conducted to each other.

When the switched capacitor conversion circuit 120 operates in the adaptive mode, the switched capacitor conversion circuit 120 controls the fourth end of the conversion capacitor CFLY to periodically switch between the second power V2 and the ground potential according to the third duty ratio, so that the voltage across the conversion capacitor CFLY is maintained at a fixed value, wherein when the fourth end of the conversion capacitor CFLY is conducted to the second power V2, the switched capacitor conversion circuit 120 controls the second power V2 and the third power V3 to be conducted to each other. When the fourth end of the conversion capacitor CFLY is conducted to the ground potential, the switched capacitor conversion circuit 120 controls the second power V2 and the third power V3 to be open circuit in between.

When the absolute value of the difference between the voltage of the third power V3 and the voltage of the first power V1 is less than the predetermined voltage difference Vth, the switched inductor conversion circuit 110 operates in the third inductive conversion mode according to a fourth duty ratio to perform the power conversion between the first power V1 and the second power V2, and the switched capacitor conversion circuit 120 operates in the adaptive mode, wherein the voltage of the second power V2 is equal to the voltage of the third power V3.

Meanwhile, when the switched inductor conversion circuit 110 operates in the third inductive conversion mode, the switched inductor conversion circuit 110 controls the coupling relationships of the first end and the second end of the inductor L according to the fourth duty ratio, so that the inductor L is periodically switched between two states: conducted between the second power V2 and the ground potential and conducted between the first power V1 and the ground potential.

When the inductive conversion circuit 110 operates in the third inductive conversion mode and the switched capacitor conversion circuit 120 operates in the adaptive mode, the switched capacitor conversion circuit 120 controls the fourth end of the conversion capacitor CFLY to periodically switch between the second power V2 and the ground potential according to the fourth duty ratio, so that the voltage across the conversion capacitor CFLY is maintained at a fixed value. When the fourth end of the conversion capacitor CFLY is conducted to the second power V2, the switched capacitor conversion circuit 120 controls the second power V2 and the third power V3 to be conducted to each other. When the fourth end of the conversion capacitor CFLY is conducted to the ground potential, the switched capacitor conversion circuit 120 controls the second power V2 and the third power V3 to be open circuit in between.

Figure 3A:
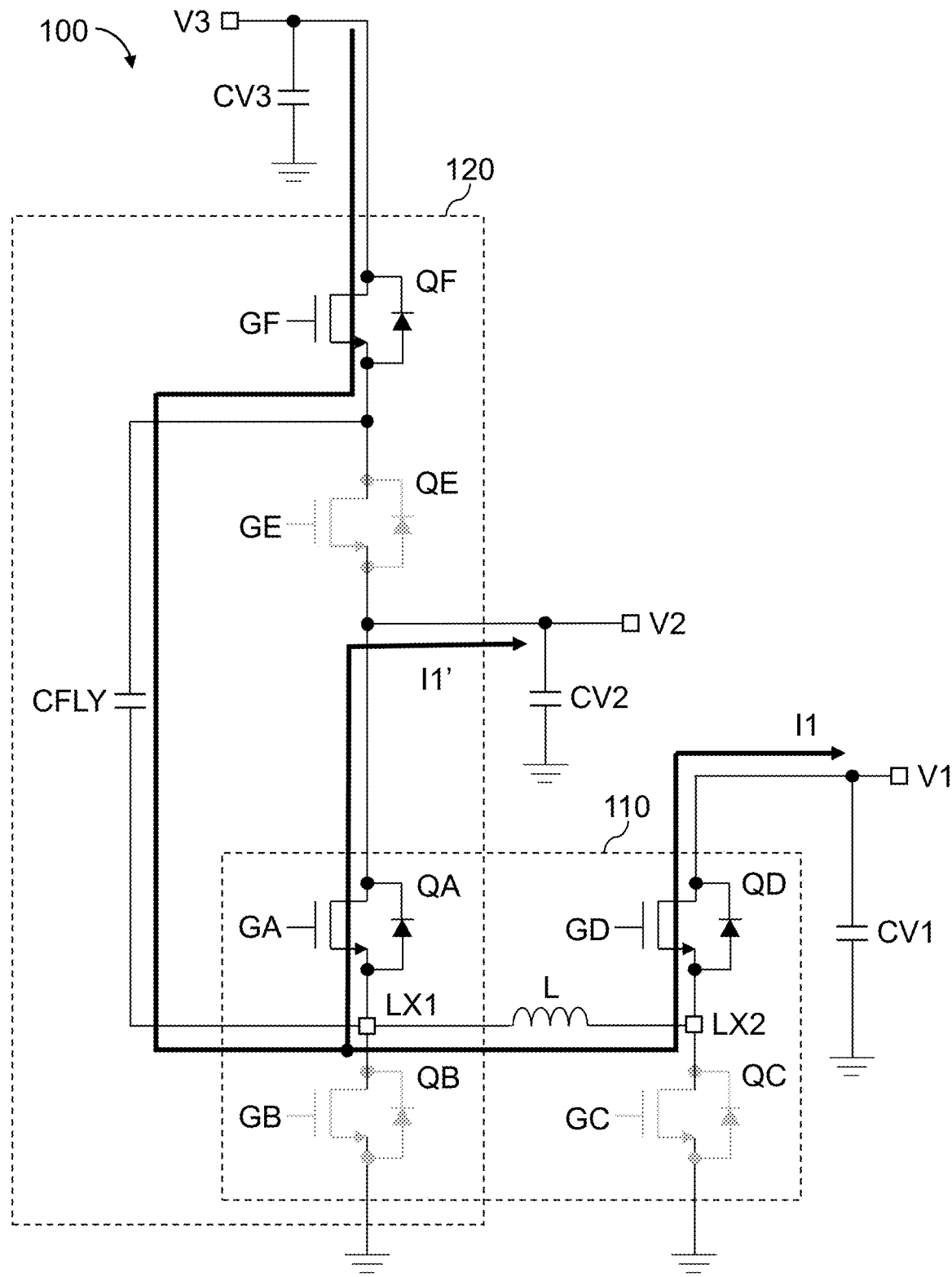
FIG. 3A is a current path diagram (1) in the hybrid switching power converter when a voltage of a third power is greater than a product of a voltage of a first power multiplied by a predetermined factor according to an embodiment of the present invention.
Figure 3B:
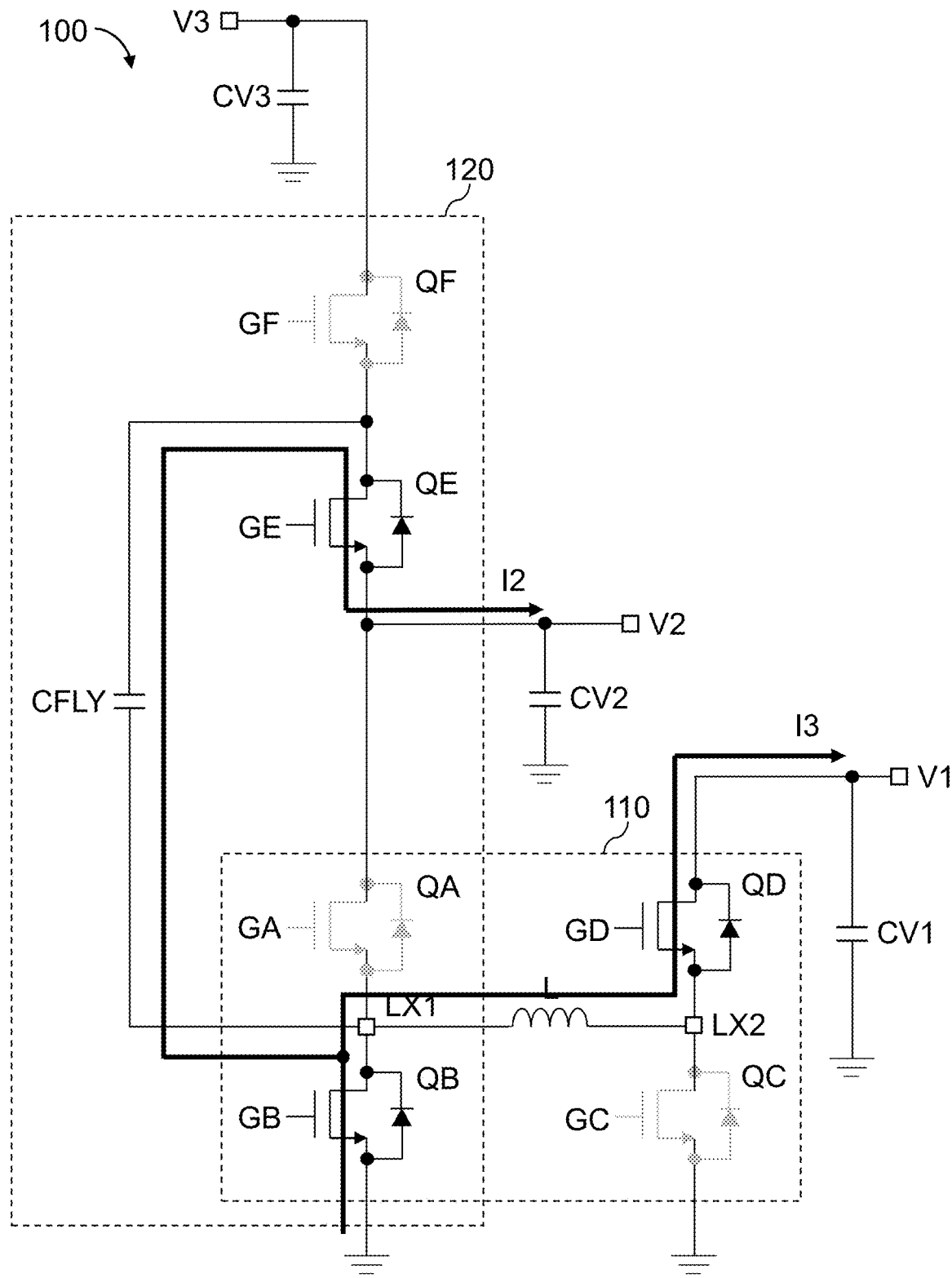
FIG. 3B is a current path diagram (2) in the hybrid switching power converter when the voltage of the third power is greater than the product of the voltage of the first power multiplied by the predetermined factor according to an embodiment of the present invention.

Please refer to FIG. 3A and FIG. 3B. FIG. 3A and FIG. 3B are current path diagrams according to an embodiment of the present invention, which is an example based on the conditions that the voltage of the third power supply V3 is greater than the product of the voltage of the first power V1 and the predetermined factor c, and the third power V3 is converted into the first power V1 and the second power V2. FIG. 3A and FIG. 3B show the current paths of two steps in one cycle in the hybrid switching power converter 100, respectively. In the present embodiment, the switched inductor conversion circuit 110 operates in the first inductive conversion mode, and the switched inductor conversion circuit 110 controls the first end (corresponding to first switching node LX1) of the inductor L to periodically switch between the second power V2 and ground potential according to the first duty ratio, that is, in one cycle, the first switch QA and the second switch QB are turned ON in turn according to the first duty ratio, and the second end (corresponding to second switching node LX2) of the inductor L is kept conducted to the first power V1.

As shown in FIG. 3A and FIG. 3B, the switched inductor conversion circuit 110 controls each of the first switch QA and the second switch QB to be periodically switched between a conductive state (ON) and a non-conductive state (OFF) according to the first duty ratio. When the first switch QA is switched to the conductive state, the second switch QB is switched to the non-conductive state, and when the second switch QB is switched to the conductive state, the first switch QA is switched to the non-conductive state, so that the first end of the inductor L is periodically switched between the second power V2 and the ground potential. In addition, the switched inductor conversion circuit 110 controls the third switch QC to be always OFF and the fourth switch QD to be always ON, so that the second end of the inductor L and the first power V1 are always conducted to each other.

In the present embodiment, the switched capacitor conversion circuit 120 operates in the capacitive conversion mode, and the switched capacitor conversion circuit 120 controls the third end of the conversion capacitor CFLY to periodically switch between the third power V3 and the second power V2 according to the first duty ratio, and controls the fourth end of the conversion capacitor to periodically switch between the second power V2 and the ground potential. As shown in FIG. 3A and FIG. 3B, the switched capacitor conversion circuit 120 controls each of the fifth switch QE and the sixth switch QF to be periodically switched between a conductive state and a non-conductive state according to the first duty ratio. When the fifth switch QE is switched to the conductive state, the sixth switch QF is switched to the non-conductive state, and when the sixth switch QF is switched to the conductive state, the fifth switch QE is switched to the non-conductive state, so that the third end of the conversion capacitor CFLY is periodically switched between the third power V3 or the second power V2.

In addition, the switched inductor conversion circuit 110 controls each of the first switch QA and the second switch QB to be periodically switched between a conductive state and a non-conductive state according to the first duty ratio (which can also be regarded as under control by the switched capacitor conversion circuit 120, because the first switch QA and the second switch QB are shared by the switched inductor conversion circuit 110 and the switched capacitor conversion circuit 120), so that the fourth end of the conversion capacitor CFLY is periodically switched between the second power V2 and the ground potential. Meanwhile, the first switch QA operates in phase with the sixth switch QF, and the second switch QB operates in phase with the fifth switch QE.

In the present embodiment, the switched inductor conversion circuit 110 operates in the first inductive conversion mode, and the switched capacitor conversion circuit 120 operates in the capacitive conversion mode, whereby the third power V3 is converted into the first power V1 and the second power V2. In other embodiments, the first power V1, the second power V2, and the third power V3 can be converted to each other. For example, when the switched inductor conversion circuit 110 operates in the first inductive conversion mode, and the switched capacitor conversion circuit 120 operates in the capacitive conversion mode, the first power V1 can be converted into the second power V2 and the third power V3, or the second power V2 can be converted into the first power V1 and the third power V3, etc.

Figure 4:
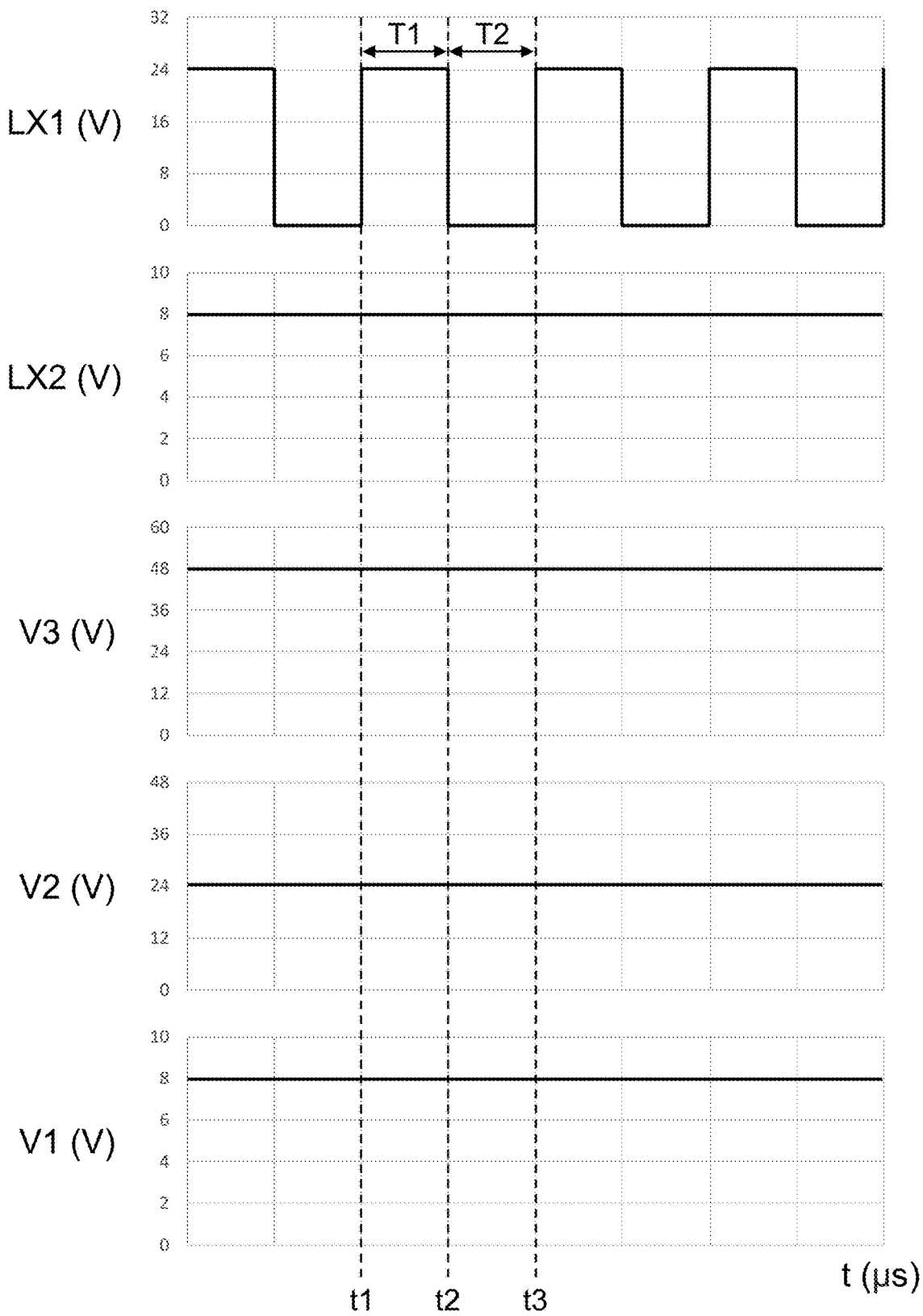
FIG. 4 is a voltage waveform diagram of the hybrid switching power converter when the voltage of the third power is greater than the product of the voltage of the first power multiplied by the predetermined factor according to an embodiment of the present invention.

Please refer to FIG. 4. FIG. 4 is a voltage waveform diagram of the hybrid switching power converter 100 when the third power V3 is greater than the product of the first power V1 multiplied by the predetermined factor c according to an embodiment of the present invention, wherein the voltage of the first power V1 is 8 volts (V), the voltage of the second power V2 is 24 volts, the voltage of the third power V3 is 48 volts, and the predetermined factor is 2. As shown in FIG. 4, the first time point t1, the second time point t2, and the third time point t3 are the time points when the hybrid switching power converter 100 switches the switches, wherein a first period T1 is between the first time point t1 and the second time point t2, a second period T2 is between the second time point t2 and the third time point t3, and the first duty cycle is relevant to a time length of the first period T1 and a time length of the second period T2, and wherein the combination of the first period T1 and the second period T2 can be regarded as a complete cycle.

In some embodiments, at the first time point t1 and the third time point t3, the switched inductor conversion circuit 110 controls the first switch QA to switch ON and controls the second switch QB to switch OFF, so that the first end of the inductor L is conducted to the second power V2. The switched capacitor conversion circuit 120 controls the fifth switch QE to switch OFF and controls the sixth switch QF to switch ON, so that the third end of the conversion capacitor CFLY is conducted to the third power V3. In the present embodiment (or in the first period T1), the current paths in the hybrid switching power converter 100 are as shown by the current I1 and the current I1' in FIG. 3A. In this case, the first power V1 and the second power V2 are the output power and the third power V3 is the input power, wherein the third power V3 charges the inductor L and the conversion capacitor CFLY and also supplies power to the first power V1 and the second power V2.

In some embodiments, at the second time point t2, the switched inductor conversion circuit 110 controls the first switch QA to switch OFF and controls the second switch QB to switch ON, so that the first end of the inductor L is grounded. The switched capacitor conversion circuit 120 controls the fifth switch QE to switch ON and controls the sixth switch QF to switch OFF, so that the third end of the conversion capacitor CFLY is conducted to the second power V2. In the present embodiment (or in the second period T2), the current paths in the hybrid switching power converter 100 are as shown by the currents I2 and I3 in FIG. 3B. In this case, the first power V1 and the second power V2 are the output power and the third power V3 is the input power, wherein the inductor L is discharged to supply power to the first power V1, and the conversion capacitor CFLY is discharged to supply power to the second power V2.

Figure 5A:
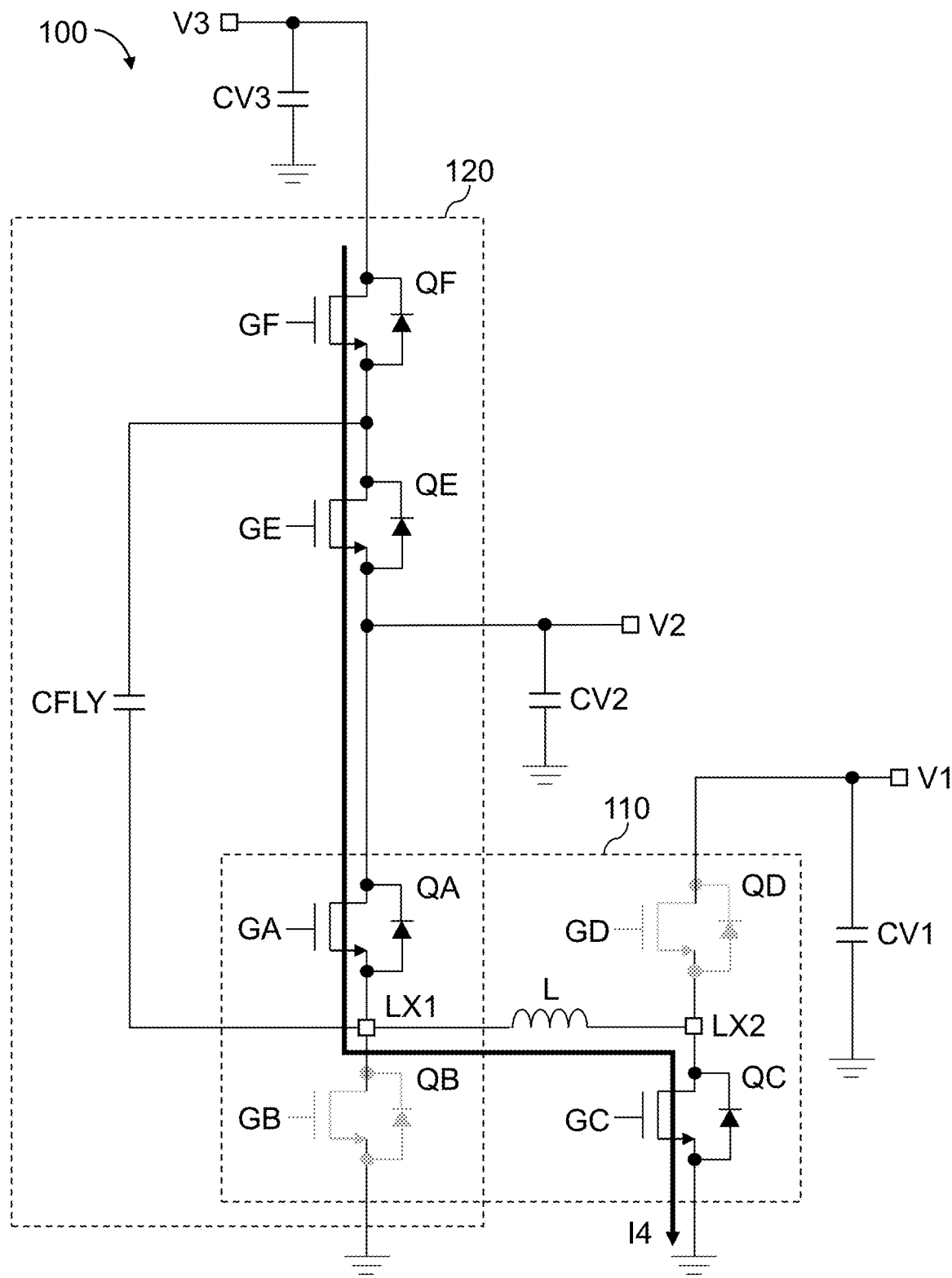
FIG. 5A is a current path diagram (1) in the hybrid switching power converter when the voltage of the third power is less than the voltage of the first power according to an embodiment of the present invention.
Figure 5B:
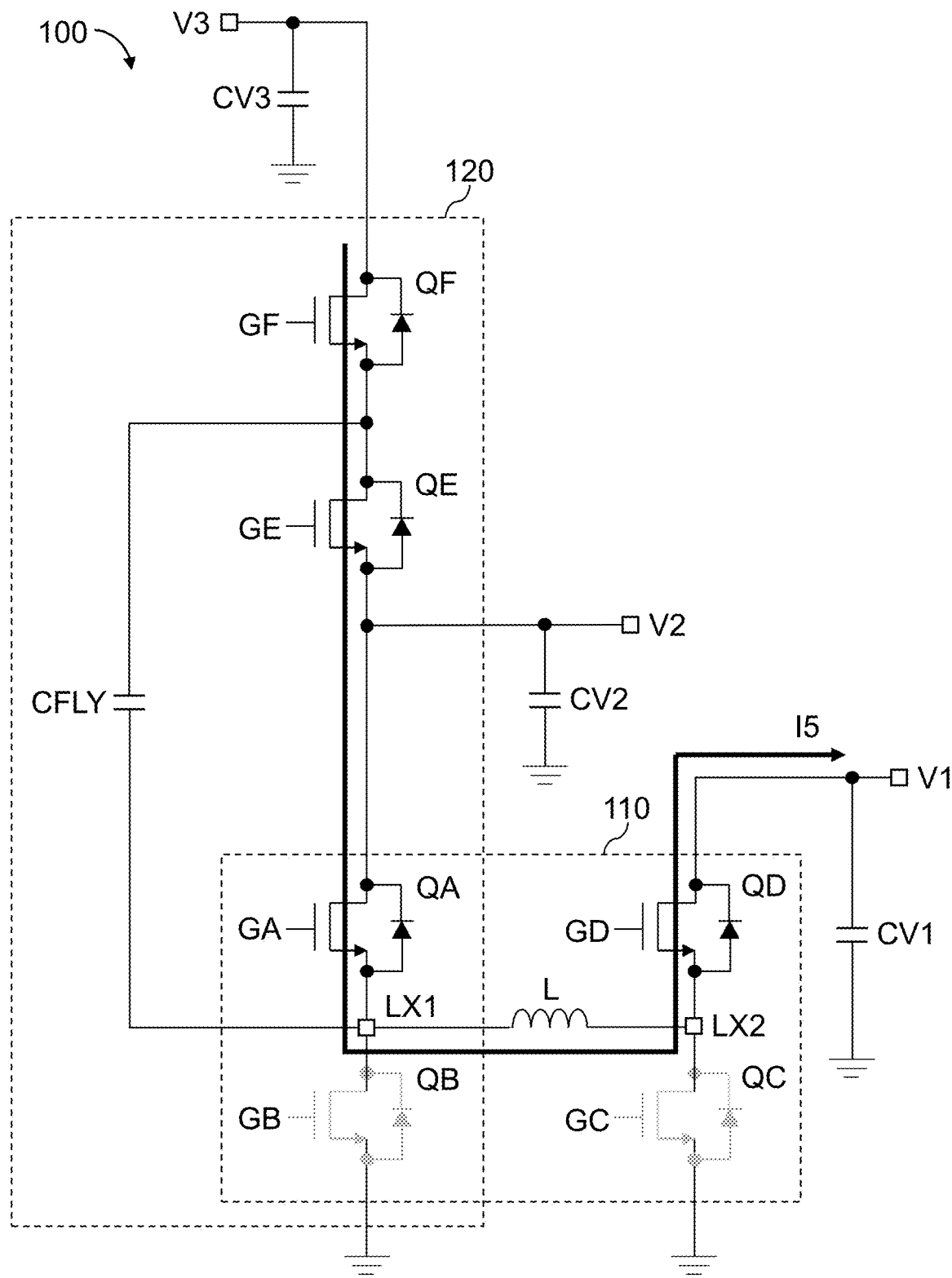
FIG. 5B is a current path diagram (2) in the hybrid switching power converter when the voltage of the third power is less than the voltage of the first power according to an embodiment of the present invention.

Please refer to FIG. 5A and FIG. 5B. FIG. 5A and FIG. 5B are current path diagrams according to an embodiment of the present invention, which is an example based on the conditions that the voltage of the third power supply V3 is less than the voltage of the first power V1, and the third power V3 is converted into the first power V1. FIG. 5A and FIG. 5B show the current path diagrams of two steps in one cycle in the hybrid switching power converter 100. In the present embodiment, when the switched inductor conversion circuit 110 operates in the second inductive conversion mode, the switched inductor conversion circuit 110 controls the first end of the inductor L and the second power V2 to be always conducted to each other and controls the other end of the inductor L according to the second duty ratio to periodically switch between the first power V1 and the ground potential. As shown in FIG. 5A and FIG. 5B, the switched inductor conversion circuit 110 controls the first switch QA to be always ON and the second switch QB to be always OFF, so that the first end of the inductor L and the second power V2 are always conducted to each other. In addition, the switched inductor conversion circuit 110 controls the third switch QC and the fourth switch QD to be turned ON in turn according to the second duty ratio, to periodically switch the second end of the inductor L between the first power V1 and the ground potential, so that the second end of the inductor L is periodically conducted to the first power V1 or the ground potential.

In the present embodiment, the switched capacitor conversion circuit 120 operates in the bypass mode, and the switched capacitor conversion circuit 120 controls the fifth switch QE and the sixth switch QF to be always ON, so that the second power V2 and the third power V3 are always conducted to each other, whereby the voltage of the second power V2 is equal to the voltage of the third power V3. In addition, since the switched inductor conversion circuit 110 simultaneously controls the first switch QA to be always ON and the second switch QB to be always OFF, the conversion capacitor CFLY is short-circuited and does not produce any effect.

Figure 6:
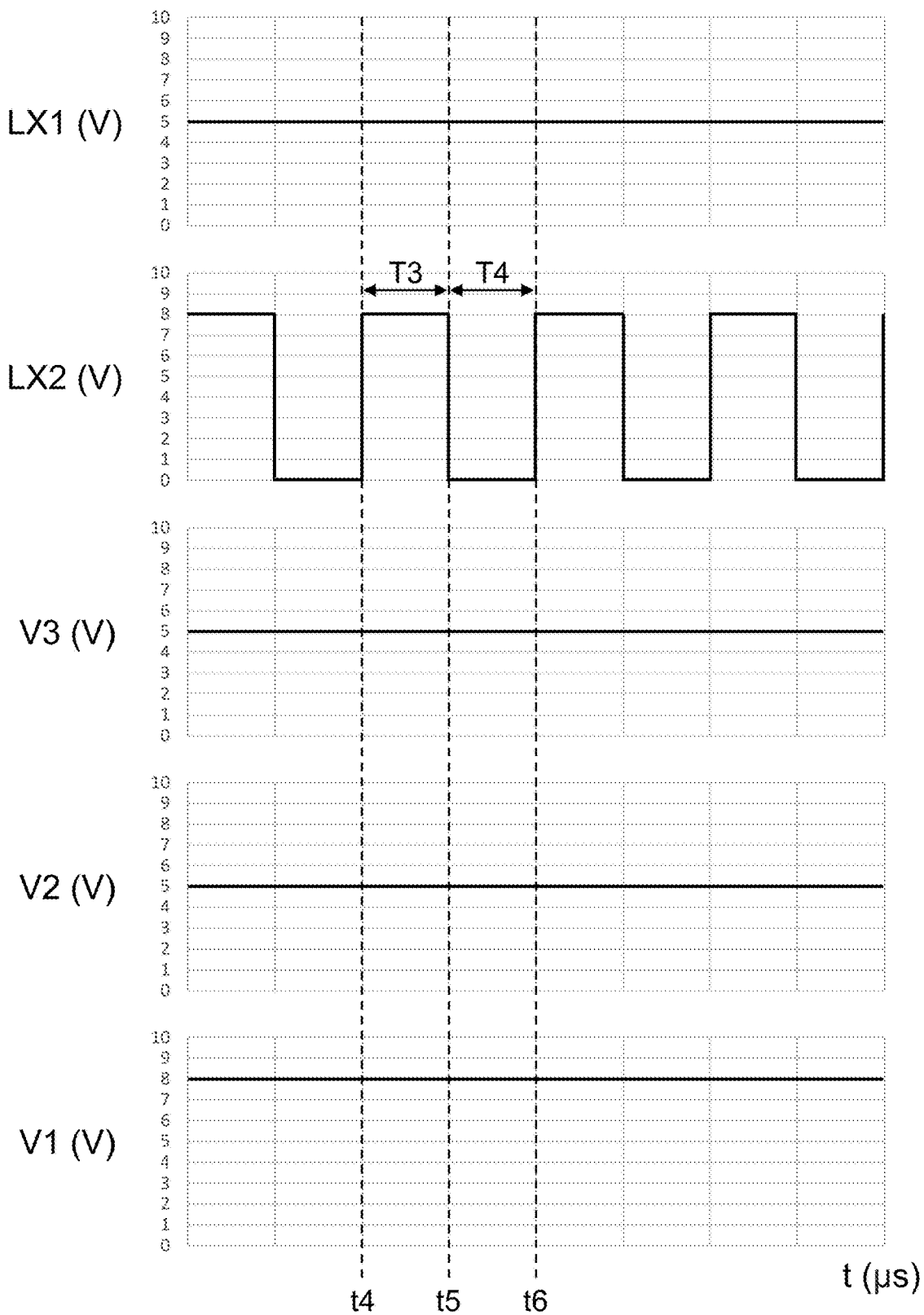
FIG. 6 is a voltage waveform diagram of the hybrid switching power converter when the voltage of the third power is less than the voltage of the first power according to an embodiment of the present invention.

Please refer to FIG. 6. FIG. 6 is a voltage waveform diagram of the hybrid switching power converter 100 when the voltage of the third power V3 is less than the voltage of the first power V1 according to an embodiment of the present invention. In this embodiment, the voltage of the first power V1 is 8 volts (V), the voltage of the second power V2 is 5 volts, and the voltage of the third power V3 is 5 volts. As shown in FIG. 6, the fourth time point t4, the fifth time point t5, and the sixth time point t6 are the time points when the hybrid switching power converter 100 switches the switches, wherein a third period T3 is between the fourth time point t4 and the fifth time point t5, a fourth period T4 is between the fifth time point t5 and the sixth time point t6, and the second duty cycle is relevant to a time length of the third period T3 and a time length of the fourth period T4, and wherein the combination of the third period T3 and the fourth period T4 can be regarded as a complete cycle.

In some embodiments, at the fourth time point t4 and the sixth time point t6, the switched inductor conversion circuit 110 controls the third switch QC to switch to the conductive state and controls the fourth switch QD to switch OFF, so that the second end of the inductor L is grounded. In the present embodiment (or in the third period T3), the current path in the hybrid switching power converter 100 is as shown by the current I4 in FIG. 5A. In this case, the first power V1 and the second power V2 are the output power and the third power V3 is the input power, wherein the third power V3 charges the inductor L and also supplies power to the second power V2.

In some embodiments, at the fifth time point t5, the switched inductor conversion circuit 110 controls the third switch QC to switch OFF and controls the fourth switch QD to switch ON, so that the second end of the inductor L is conducted to the first power V1. In the present embodiment (or in the fourth period T4), the current path in the hybrid switching power converter 100 is as shown by the current I5 in FIG. 5B. In this case, the first power V1 and the second power V2 are output power and the third power V3 is the input power, wherein the third power V3 charges the inductor L and also supplies power to the first power V1 and the second power V2.

Figure 7A:
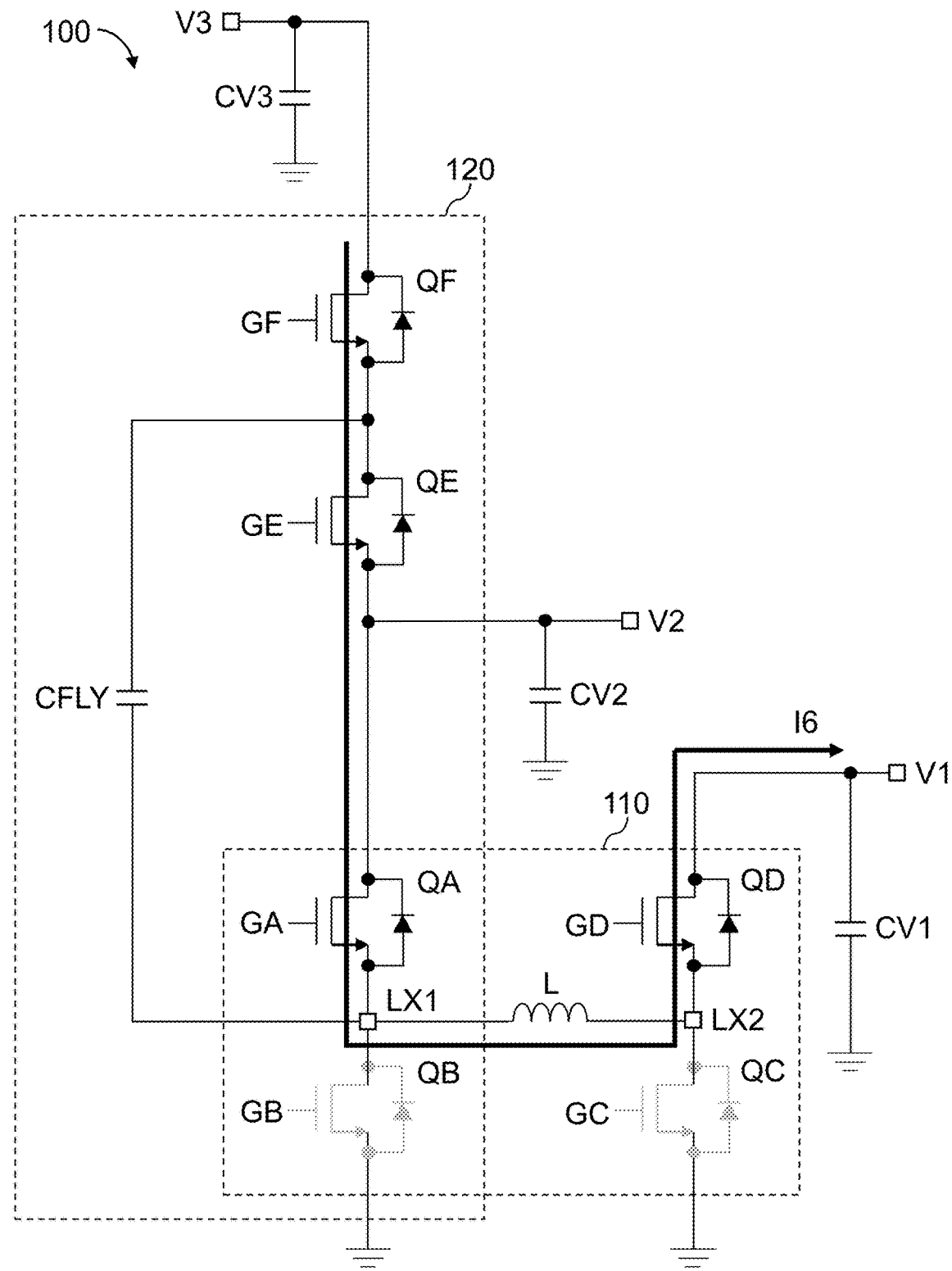
FIG. 7A is a current path diagram (1) in the hybrid switching power converter when the voltage of the third power is greater than the voltage of the first power and less than the product of the voltage of the first power multiplied by the predetermined factor according to an embodiment of the present invention.
Figure 7B:
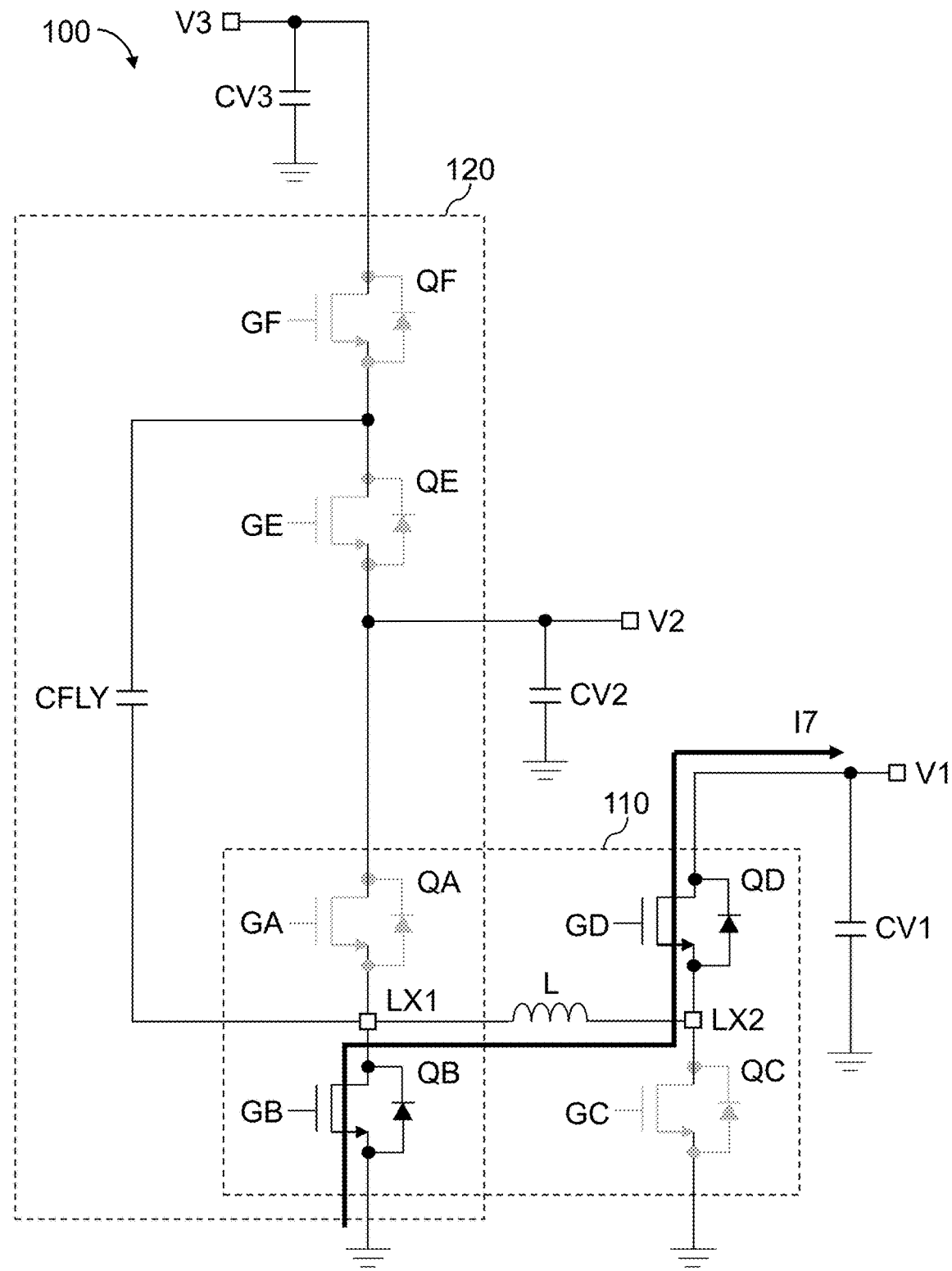
FIG. 7B is a current path diagram (2) in the hybrid switching power converter when the voltage of the third power is greater than the voltage of the first power and less than the product of the voltage of the first power multiplied by the predetermined factor according to an embodiment of the present invention.

Please refer to FIG. 7A and FIG. 7B. FIG. 7A and FIG. 7B are current path diagrams according to an embodiment of the present invention, which is an example based on the conditions that the voltage of the third power supply V3 is greater than the voltage of the first power V1 and less than the product of the voltage of the first power V1 multiplied by the predetermined factor c, and the third power V3 is converted into the first power V1 and the second power V2. FIG. 7A and FIG. 7B show the current path diagrams of two steps in one cycle in the hybrid switching power converter 100. In the present embodiment, the switched inductor conversion circuit 110 operates in the first inductive conversion mode, and the switched inductor conversion circuit 110 controls the first end of the inductor L to periodically switch between the second power V2 and ground potential according to the third duty ratio, that is, in one cycle, the first switch QA and the second switch QB are turned ON in turn according to the third duty ratio, and the second end of the inductor L is always conducted to the first power V1.

As shown in FIG. 7A and FIG. 7B, the switched inductor conversion circuit 110 controls each of the first switch QA and the second switch QB to be periodically switched between a conductive state and a non-conductive state according to the third duty ratio, wherein when the first switch QA is switched to the conductive state, the second switch QB is switched to the non-conductive state, and when the second switch QB is switched to the conductive state, the first switch QA is switched to the non-conductive state, so that the first end of the inductor L is periodically switched between the second power V2 and the ground potential. In addition, the switched inductor conversion circuit 110 controls the third switch QC to be always OFF and the fourth switch QD to be always ON, so that the other end of the inductor L and the first power V1 are always conducted to each other.

In the present embodiment, when the switched capacitor conversion circuit 120 operates in the adaptive mode, the switched capacitor conversion circuit 120 controls the fourth end of the conversion capacitor CFLY to periodically switch between the second power V2 and the ground potential according to the third duty ratio, so that the voltage across the conversion capacitor CFLY is maintained at a fixed value. Meanwhile, when the third end of the conversion capacitor CFLY is conducted to the second power V2, the switched capacitor conversion circuit 120 controls the second power V2 and the third power V3 to be conducted to each other, and when the fourth end of the conversion capacitor CFLY is conducted to the ground potential, the switched capacitor conversion circuit 120 controls the second power V2 and the third power V3 to be open circuit in between. In some embodiments, the fixed value is 0 volts.

Figure 8:
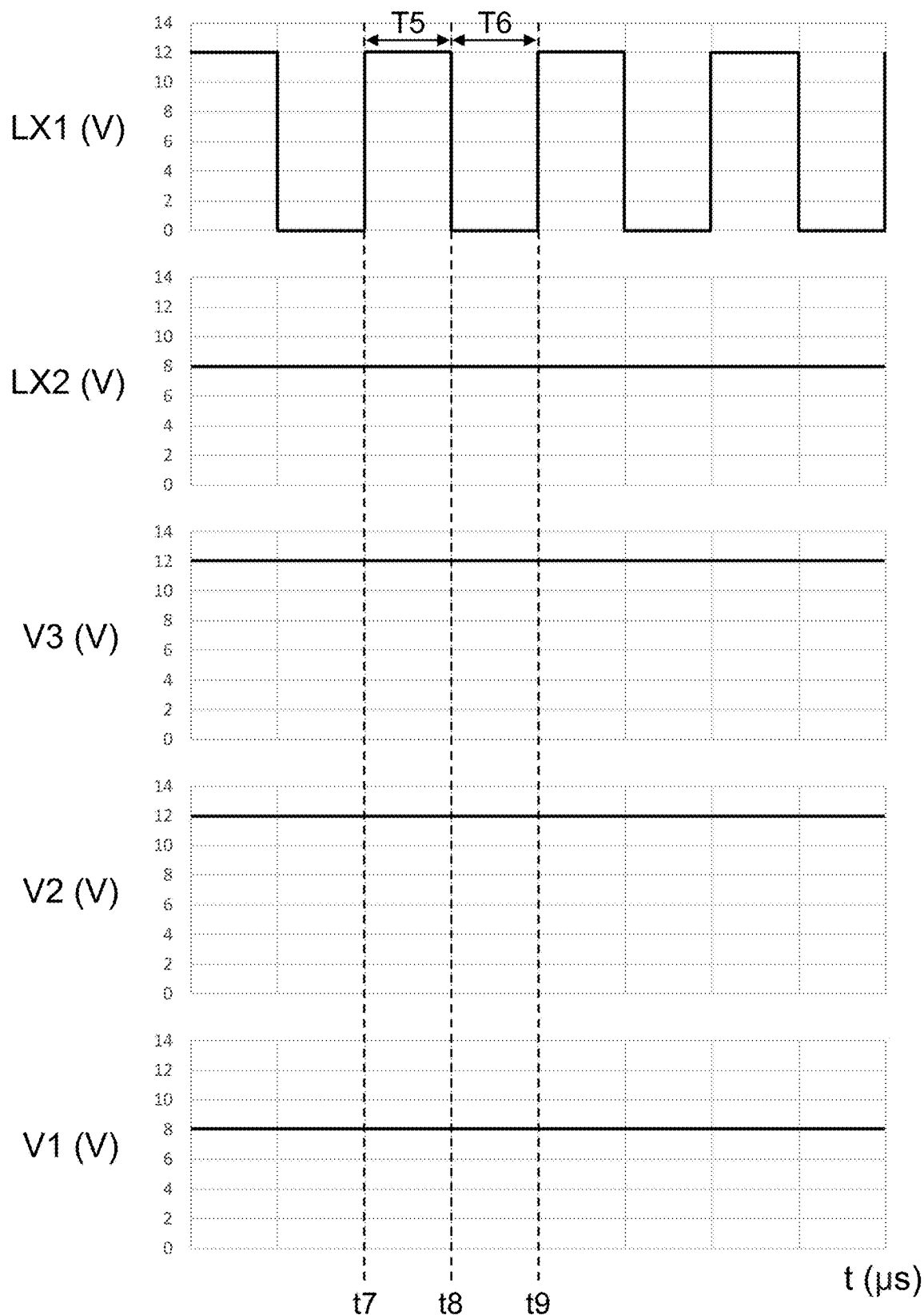
FIG. 8 is a voltage waveform diagram of the hybrid switching power converter when the voltage of the third power is greater than the voltage of the first power and less than the product of the voltage of the first power multiplied by the predetermined factor according to an embodiment of the present invention.

Please refer to FIG. 8. FIG. 8 is a voltage waveform diagram of the hybrid switching power converter 100 when the voltage of the third power V3 is greater than the voltage of the first power V1 and less than the product of the voltage of the first power V1 multiplied by the predetermined factor c according to an embodiment of the present invention, wherein the voltage of the first power V1 is 8 volts, the voltage of the second power V2 is 12 volts, the voltage of the third power V3 is 12 volts, and the predetermined factor is 2. As shown in FIG. 8, the seventh time point t7, the eighth time point t8, and the ninth time point t9 are the time points when the hybrid switching power converter 100 switches the switches, wherein a fifth period T5 is between the seventh time point t7 and the eighth time point t8, a sixth period T6 is between the eighth time point t8 and the ninth time point t9, and the third duty ratio is relevant to a time length of the fifth period T5 and a time length of the sixth period T6, and wherein the combination of the fifth period T5 and the sixth period T6 can be regarded as a complete cycle.

In some embodiments, at the seventh time point t7 and the ninth time point t9, the switched inductor conversion circuit 110 controls the first switch QA to switch ON and controls the second switch QB to switch OFF, so that the first end of the inductor L is conducted to the second power V2. The switched capacitor conversion circuit 120 controls the fifth switch QE and the sixth switch QF to follow the first switch QA to switch ON (in-phase switching), so that the second power V2 and the third power V3 are conducted to each other. In the present embodiment (or in the fifth period T5), the current path in the hybrid switching power converter 100 is as shown by the current I6 in FIG. 7A, In this case, the first power V1 and the second power V2 are the output power and the third power V3 is the input power, wherein the third power V3 charges the inductor L and also supplies power to the first power V1 and the second power V2.

In some embodiments, at the second time point t2, the switched inductor conversion circuit 110 controls the first switch QA to switch OFF and controls the second switch QB to switch ON, so that an end of the inductor L is grounded. The switched capacitor conversion circuit 120 controls the fifth switch QE and the sixth switch QF to follow the first switch QA to switch OFF (in-phase switching), so that the second power V2 and the third power V3 are open-circuited in between. In the present embodiment (or in the sixth period T6), the current path in the hybrid switching power converter 100 is as shown by the current I7 in FIG. 7B. In this case, the first power V1 and the second power V2 are the output power and the third power V3 is the input power, wherein the inductor L is discharged to supply power to the first power V1.

Figure 9A:
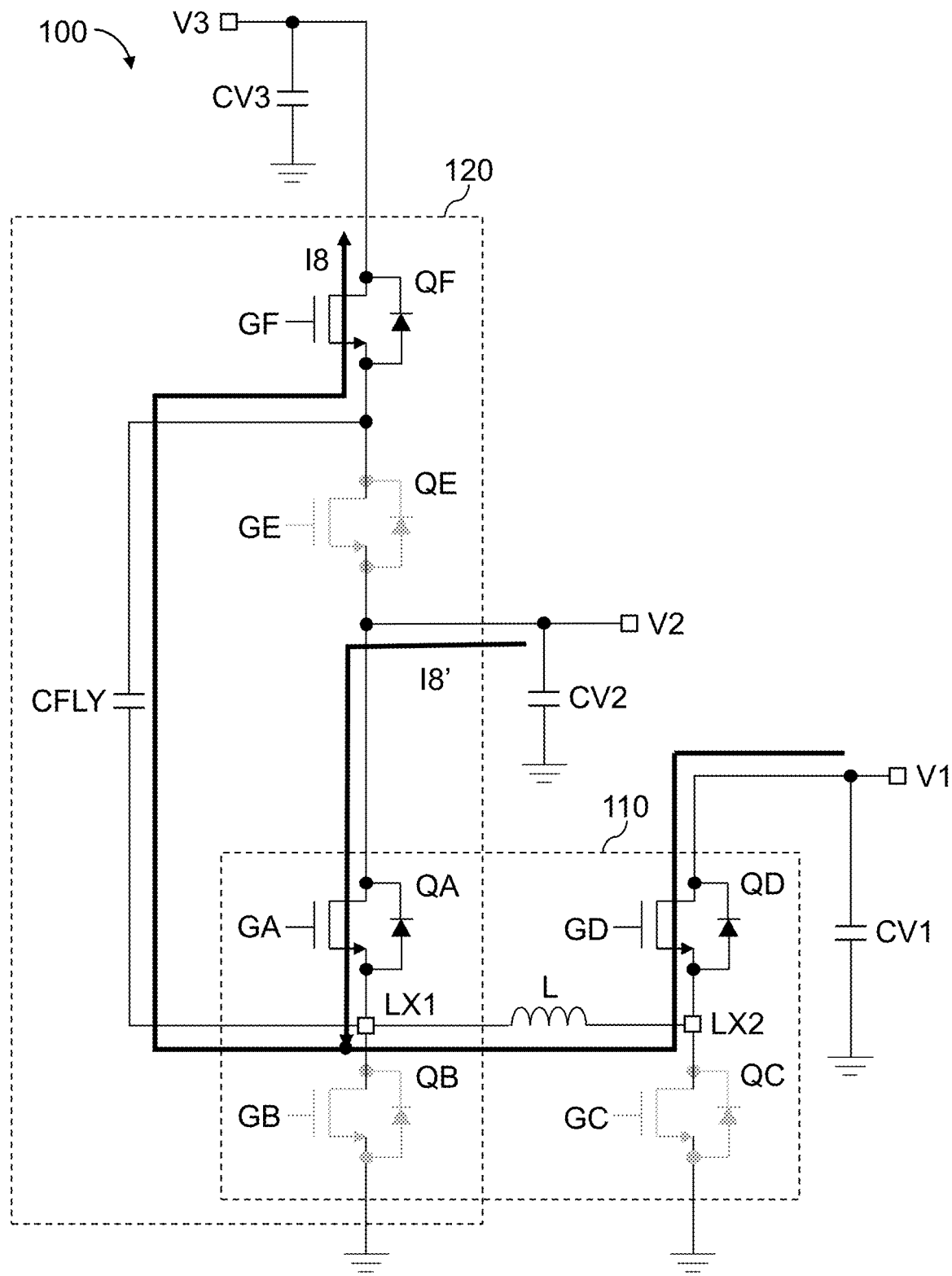
FIG. 9A is a current path diagram (3) in the hybrid switching power converter when the voltage of the third power is greater than the product of the voltage of the first power and multiplied by predetermined factor according to an embodiment of the present invention.
Figure 9B:
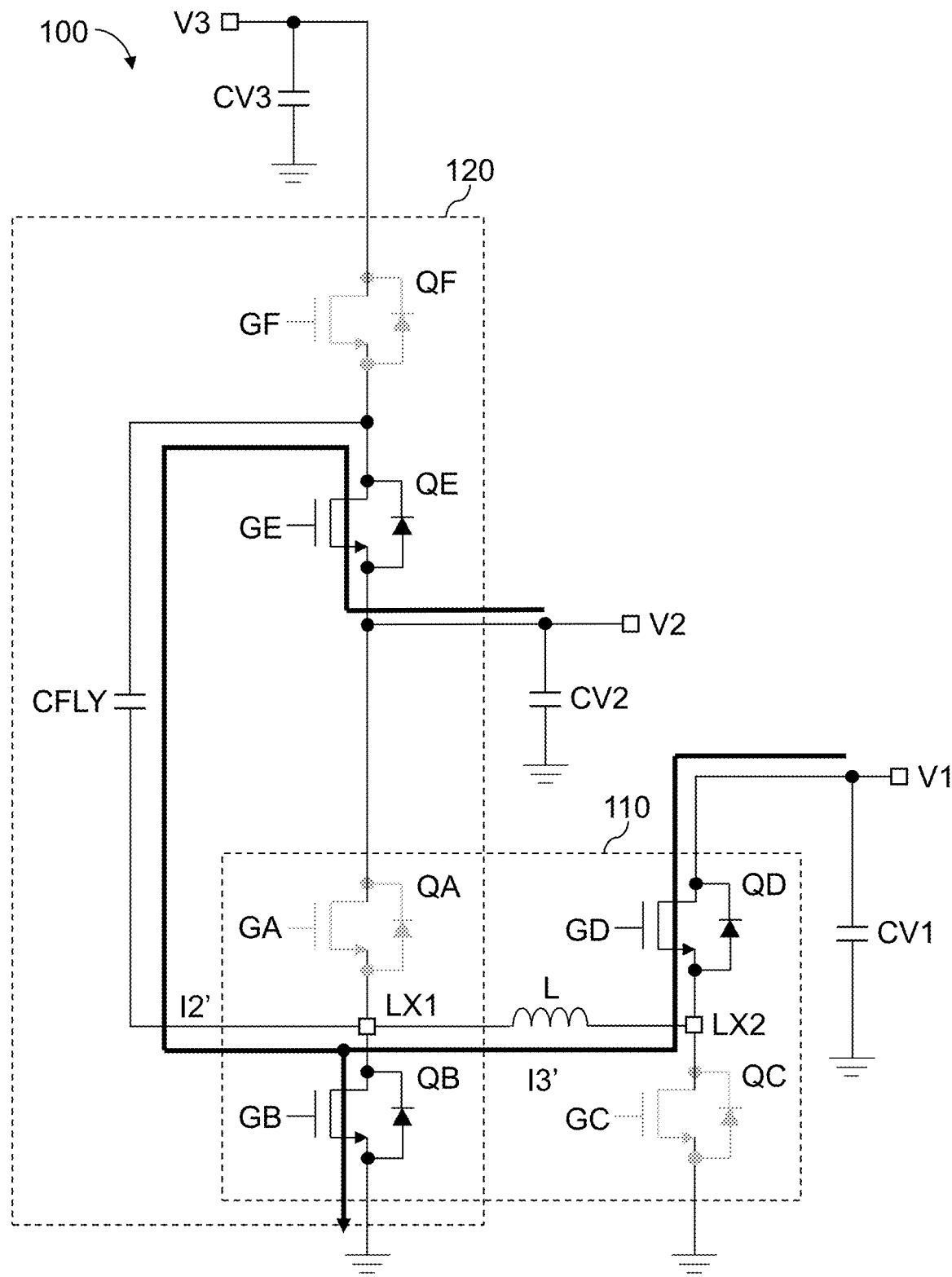
FIG. 9B is a current path diagram (4) in the hybrid switching power converter when the voltage of the third power is greater than the product of the voltage of the first power multiplied by the predetermined factor according to an embodiment of the present invention.

In some embodiments, the first power V1 and the second power V2 are the input powers, and the third power V3 is the output power. Please refer to FIG. 4, FIG. 9A and FIG. 9B, wherein FIG. 9A and FIG. 9B are current path diagrams of two steps in one cycle of the hybrid switching power converter 100 when the voltage of the third power V3 is greater than the product of the voltage of the first power V1 multiplied by the predetermined factor c according to an embodiment of the present invention. For example, as shown in FIG. 4, in the first period T1, the current paths in the hybrid switching power converter 100 are shown as currents I8 and I8' in FIG. 9A. In this case, the first power V1 and the second power V2 are the input powers and the third power V3 is the output power, wherein the first power V1 and the second power V2 supply power to the third power V3, and the inductor L and the conversion capacitor CFLY are discharged to supply power to the third power V3. In the second period T2, the current paths in the hybrid switching power converter 100 are shown as the currents I2' and I3' in FIG. 9B. In this case, the first power V1 and the second power V2 are the input powers and the third power V3 is the output power, wherein the first power V1 charges the inductor L, and the second power V2 charges the conversion capacitor CFLY.

Figure 10A:
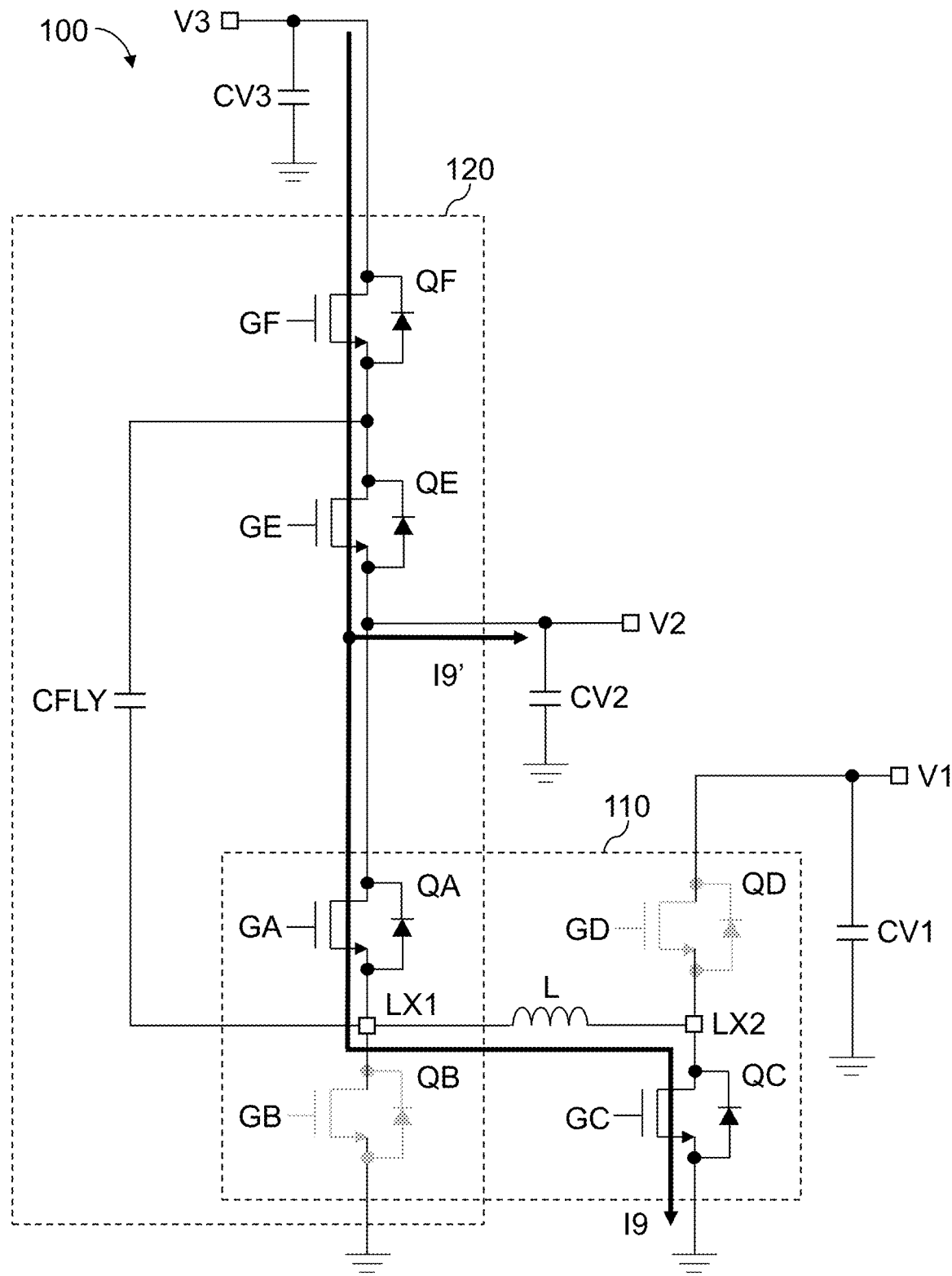
FIG. 10A is a current path diagram (1) in the hybrid switching power converter when an absolute value of a difference between the voltage of the third power and the voltage of the first power is less than a predetermined voltage difference according to an embodiment of the present invention.
Figure 10B:
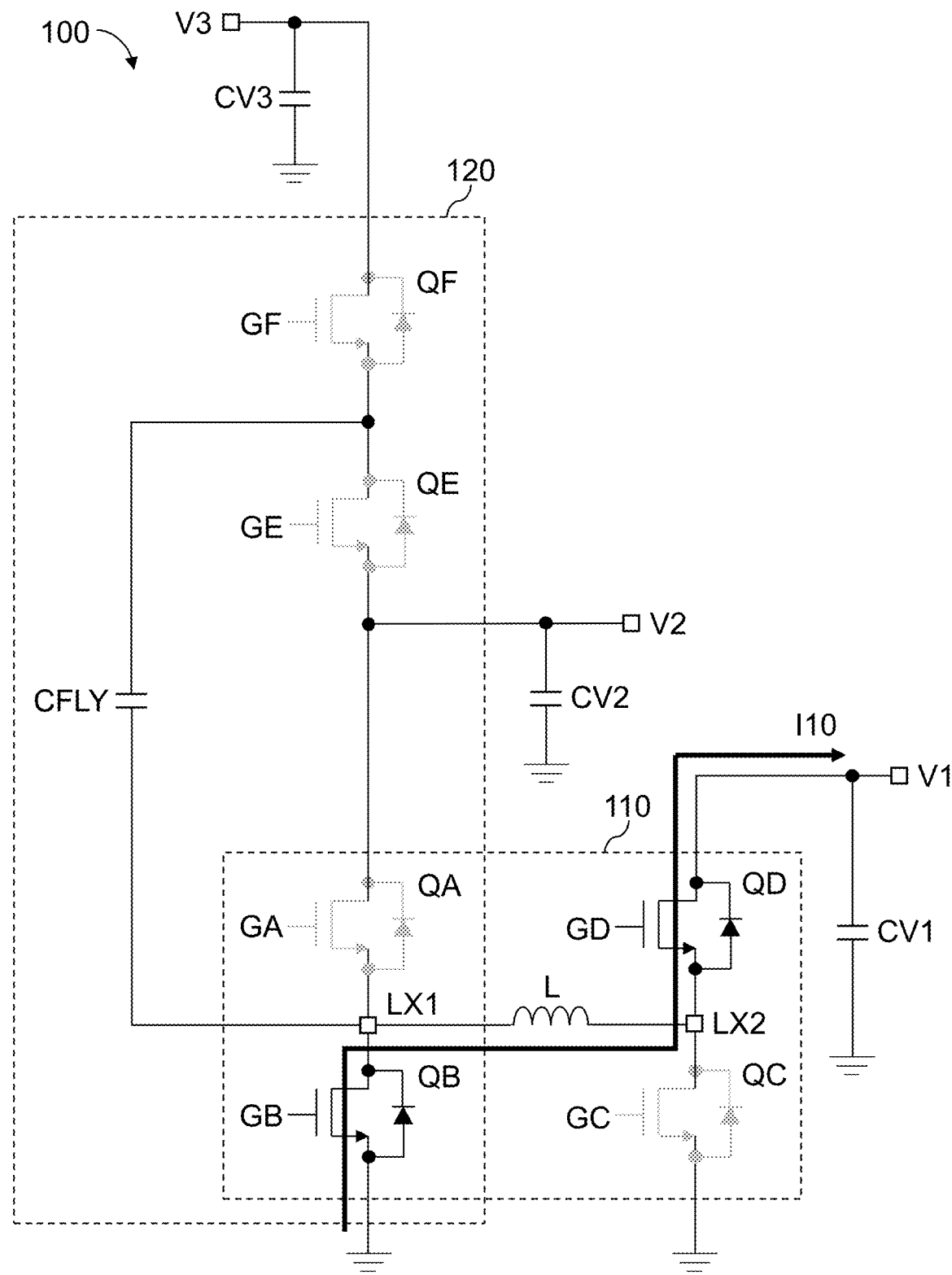
FIG. 10B is a current path diagram (s) in the hybrid switching power converter when the absolute value of the difference between the voltage of the third power and the voltage of the first power is less than the predetermined voltage difference according to an embodiment of the present invention.

Please refer to FIG. 10A and FIG. 10B. FIG. 10A and FIG. 10B are current path diagrams according to an embodiment of the present invention, which is an example based on the conditions that an absolute value of a difference between the voltage of the third power V3 and the voltage of the first power V1 is less than a predetermined voltage difference Vth, and the third power V3 is converted into the first power V1 and the second power V2. FIG. 10A and FIG. 10B show the current path diagrams of two steps in one cycle in the hybrid switching power converter 100. In the present embodiment, the switched inductor conversion circuit 110 operates in the third inductive conversion mode to perform the power conversion between the first power V1 and the second power V2. The switched inductor conversion circuit 110 controls the coupling relationships of the first end and the second end of the inductor L according to the fourth duty ratio, so that the inductor L is periodically switched between two states: conducted between the second power V2 and the ground potential or conducted between the first power V1 and the ground potential, that is, in one cycle, the first switch QA and the third switch QC are operated in phase, and the second switch QB and the fourth switch QD are operated in phase, and they are turned ON in turn according to the fourth duty ratio.

As shown in FIG. 10A and FIG. 10B, the switched inductor conversion circuit 110 controls the first switch QA and the third switch QC to be in synchronization with each other and controls the second switch QB and the fourth switch QD to be in synchronization with each other, so that the two sets of switches are periodically switched between a conductive state and a non-conductive state according to the fourth duty cycle, respectively. When the first switch QA and the third switch QC are switched to the conductive state, the second switch QB and the fourth switch QD are switched to the non-conductive state, and when the second switch QB and the fourth switch QD are switched to the conductive state, the first switch QA and the third switch QC are switched to the non-conductive state, so that the inductor L is periodically switched between two states: conducted between the second power V2 and the ground potential or conducted between the first power V1 and the ground potential.

In the present embodiment, when the switched capacitor conversion circuit 120 operates in the adaptive mode, the switched capacitor conversion circuit 120 controls the fourth end of the conversion capacitor CFLY to periodically switch between the second power V2 and the ground potential according to the fourth duty ratio, so that the voltage across the conversion capacitor CFLY is maintained at a fixed value. When the third end of the conversion capacitor CFLY is conducted to the second power V2, the switched capacitor conversion circuit 120 controls the second power V2 and the third power V3 to be conducted to each other. When the fourth end of the conversion capacitor CFLY is conducted on the ground potential, the switched capacitor conversion circuit 120 controls the second power V2 and the third power V3 to be open circuit in between. In some embodiments, the fixed value is 0 volts.

In some embodiments, the aforementioned switches (including first switch QA, second switch QB, third switch QC, fourth switch QD, fifth switch QE, and sixth switch Q6) are N-type metal-oxide-semiconductor (NMOS) transistors or P-type metal-oxide-semiconductor (PMOS) transistors, wherein a control end of the aforementioned switches corresponds to the gate of the NMOS or the gate of the PMOS, an output end of the aforementioned switches corresponds to the drain of the NMOS or the source of the PMOS, and the other output end of the aforementioned switches corresponds to the source of the NMOS or the drain of the PMOS.

To sum up, when the USB PD 3.1 specification is applied to the hybrid switching power converter 100 of the present invention, the present invention can effectively perform power conversion with high efficiency and can cover a broader voltage range. In addition, the hybrid switching power converter 100 of the present invention can simultaneously supply power to two independent output powers by one power conversion, whereby the present invention can be flexibly applied to more applications. Furthermore, since the switched inductor conversion circuit 110 and the switched capacitor conversion circuit 120 of the present invention share the first switch QA and the second switch QB, the present invention reduces the number of devices in the hybrid switching power converter 100, so that the present invention has the advantages of lower cost, smaller size, and lower overall power loss.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A hybrid switching power converter configured to perform power conversion among a first power, a second power, and a third power, the hybrid switching power converter comprising:
   a switched inductor conversion circuit, comprising a plurality of inductive switches and an inductor, wherein the inductive switches comprise a first switch and a second switch, and the switched inductor conversion circuit is configured to switch coupling relationships between the inductor and the first power and between the inductor and the first power the second power to perform the power conversion between the first power and the second power; and
   a switched capacitor conversion circuit, comprising a plurality of capacitive switches and a conversion capacitor, wherein the capacitive switches comprise the first switch and the second switch, and the switched capacitor conversion circuit is configured to switch coupling relationships between the conversion capacitor and the second power and between the conversion capacitor and the third power to perform the power conversion between the second power and the third power;
   wherein when a voltage of the third power is greater than a product of a voltage of the first power multiplied by a predetermined factor, the switched inductor conversion circuit operates in a first inductive conversion mode according to a first duty ratio to perform the power conversion between the first power and the second power, and the switched capacitor conversion circuit operates in a capacitive conversion mode according to the first duty ratio to perform the power conversion between the second power and the third power, wherein a voltage of the second power is greater than the voltage of the first power, the voltage of the third power is a product of the voltage of the second power multiplied by the predetermined factor, and the predetermined factor is greater than one;
   wherein when the switched inductor conversion circuit operates in the first inductive conversion mode, the switched inductor conversion circuit controls a first end of the inductor to periodically switch between the second power a ground potential according to the first duty ratio and controls a second end of the inductor and the first power to be always conducted to each other; and
   wherein when the switched capacitor conversion circuit operates in the capacitive conversion mode, the switched capacitor conversion circuit controls a third end of the conversion capacitor to periodically switch between the third power and the second power according to the first duty ratio and controls a fourth end of the conversion capacitor to periodically switch between the second power and the ground potential.

2. The hybrid switching power conversion circuit of claim 1, wherein the predetermined factor is two.

3. The hybrid switching power conversion circuit of claim 1, wherein when the voltage of the third power is less than the voltage of the first power, the switched inductor conversion circuit operates in a second inductive conversion mode according to a second duty ratio to perform the power conversion between the first power and the second power, and the switched capacitor conversion circuit operates in a bypass mode, wherein the voltage of the second power is less than the voltage of the first power;
   wherein when the voltage of the third power is greater than the voltage of the first power and less than the product of the voltage of the first power multiplied by the predetermined factor, the switched inductor conversion circuit operates in the first inductive conversion mode according to a third duty ratio to perform the power conversion between the first power and the second power, and the switched capacitor conversion circuit operates in an adaptive mode according to the third duty ratio;

wherein when the switched inductor conversion circuit operates in the second inductive conversion mode, the switched inductor conversion circuit controls the first end of the inductor and the second power to be always conducted to each other and controls the second end of the inductor to periodically switch between the first power and the ground potential according to the second duty ratio;

wherein when the switched capacitor conversion circuit operates in the bypass mode, the switched capacitor conversion circuit controls the second power and the third power to be always conducted to each other; and wherein when the switched capacitor conversion circuit operates in the adaptive mode, the switched capacitor conversion circuit controls the fourth end of the conversion capacitor to periodically switch between the second power and the ground potential according to the third duty ratio, so that a voltage across the conversion capacitor is maintained at a fixed value, wherein when the fourth end of the conversion capacitor is conducted on the second power, the switched capacitor conversion circuit controls the second power and the third power to be conducted to each other, and when the fourth end of the conversion capacitor is conducted on the ground potential, the switched capacitor conversion circuit controls the second power and the third power to be open circuit in between.

4. The hybrid switching power conversion circuit of claim 3, wherein the fixed value is zero volt.

5. The hybrid switching power conversion circuit of claim 3, wherein the inductive switches further comprise a third switch and a fourth switch, wherein the first switch and the second switch are coupled in series between the second power and the ground potential and are commonly coupled to the first end of the inductor and the fourth end of the conversion capacitor, the third switch and the fourth switch are coupled in series between the ground potential and the first power and are commonly coupled to the second end of the inductor;

the capacitive switches further comprise a fifth switch and a sixth switch, wherein the fifth switch and the sixth switch are coupled in series between the second power and the third power and are commonly coupled to the third end of the conversion capacitor, the fifth switch and the first switch are coupled in series between the third end and the fourth end of the conversion capacitor and are commonly coupled to the second power;

wherein the first power is coupled to the fourth switch, the second power is coupled between the first switch and the fifth switch, and the third power is coupled to the sixth switch.

6. The hybrid switching power conversion circuit of claim 5, wherein when the switched capacitor conversion circuit operates in the first inductive conversion mode, the first switch and the second switch are periodically turned ON in turn according to the first duty ratio, the third switch is always OFF, and the fourth switch is always ON.

7. The hybrid switching power conversion circuit of claim 5, wherein when the switched capacitor conversion circuit operates in the second inductive conversion mode, the first switch is always ON, the second switch is always OFF, and the third switch and the fourth switch are periodically turned ON in turn according to the second duty ratio.

8. The hybrid switching power conversion circuit of claim 5, wherein when the switched capacitor conversion circuit operates in the capacitive conversion mode, the first switch, the second switch, the fifth switch, and the sixth switch are periodically turned ON in turn according to the first duty ratio in a manner that the first switch and the sixth switch are switched in phase, and the second switch and the fifth switch are switched in phase.

9. The hybrid switching power conversion circuit of claim 5, wherein when the switched capacitor conversion circuit operates in the bypass mode, the first switch, the fifth switch, and the sixth switch are always ON, and the second switch is always OFF.

10. The hybrid switching power conversion circuit of claim 5, wherein when the switched capacitor conversion circuit operates in the adaptive mode, the first switch and the second switch are periodically turned ON in turn according to the second duty ratio, and the fifth switch and the sixth switch are switched in phase with the first switch.

11. The hybrid switching power conversion circuit of claim 1, wherein when an absolute value of a difference between the voltage of the third power and the voltage of the first power is less than a predetermined voltage difference, the switched inductor conversion circuit operates in a third inductive conversion mode according to a fourth duty ratio to perform the power conversion between the first power and the second power, and the switched capacitor conversion circuit operates in the adaptive mode, wherein the voltage of the second power is equal to the voltage of the third power;

wherein when the switched inductor conversion circuit operates in the third inductive conversion mode, the switched inductor conversion circuit controls coupling relationships of the first end and the second end of the inductor according to the fourth duty ratio, so that the inductor is periodically switched between two states: conducted between the second power and the ground potential or conducted between the first power and the ground potential; and wherein when the switched capacitor conversion circuit operates in the adaptive mode, the switched capacitor conversion circuit controls the fourth end of the conversion capacitor to periodically switch between the second power and the ground potential according to the fourth duty ratio, so that a voltage across the conversion capacitor is maintained at a fixed value, wherein when the fourth end of the conversion capacitor is conducted to the second power, the switched capacitor conversion circuit controls the second power and the third power to be conducted to each other, and when the fourth end of the conversion capacitor is conducted to the ground potential, the switched capacitor conversion circuit controls the second power and the third power to be open circuit in between.

\* \* \* \* \*